United States Patent
Petter et al.

(10) Patent No.: US 8,463,762 B2
(45) Date of Patent: Jun. 11, 2013

(54) VOLUMES AND FILE SYSTEM IN CLUSTER SHARED VOLUMES

(75) Inventors: Vladimir Petter, Bellevue, WA (US); Vinod R. Shankar, Woodinville, WA (US); Andrea D'Amato, Kirkland, WA (US); Rajsekhar Das, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 12/971,322

(22) Filed: Dec. 17, 2010

(65) Prior Publication Data

US 2012/0158681 A1  Jun. 21, 2012

(51) Int. Cl.
*G06F 17/00* (2006.01)

(52) U.S. Cl.
USPC .......................................... 707/704; 707/827

(58) Field of Classification Search
USPC ................................. 707/704, 827
See application file for complete search history.

(56) References Cited

U.S. PATENT DOCUMENTS

| | | | |
|---|---|---|---|
| 5,394,555 | A | 2/1995 | Hunter et al. |
| 6,865,597 | B1 | 3/2005 | Bandopadhyay et al. |
| 6,954,881 | B1 | 10/2005 | Flynn Jr. et al. |
| 7,062,675 | B1 * | 6/2006 | Kemeny et al. ............... 714/15 |
| 7,627,699 | B1 * | 12/2009 | Arumugham et al. ........ 709/203 |
| 2003/0126200 | A1 * | 7/2003 | Wolff ........................... 709/203 |
| 2004/0181576 | A1 * | 9/2004 | Lin et al. ....................... 709/203 |
| 2005/0283658 | A1 | 12/2005 | Clark |
| 2008/0005196 | A1 | 1/2008 | Beck |
| 2009/0292734 | A1 * | 11/2009 | Miloushev et al. ......... 707/104.1 |
| 2009/0327798 | A1 | 12/2009 | D'Amato |
| 2010/0217929 | A1 * | 8/2010 | Kirshenbaum et al. ........ 711/112 |

OTHER PUBLICATIONS

Ekren, Steven, "Innovating High Availability with Cluster Shared Volumes", 2009, 44 pages.
Petter, Vladimir, "Failover Clustering Performance Counters—Part 1", Sep. 4, 2009, 4 pages.
Schulman, Jerold, "JSI Tip 6544. The Microsoft Windows Cluster Service (MSCS) clustering model", Apr. 7, 2003, 2 pages.
Perriman, Symon, "Cluster Shared Volumes (CSV): Disk Ownership", Mar. 1, 2009, 4 pages.

* cited by examiner

*Primary Examiner* — Wilson Lee
*Assistant Examiner* — Tiffany Thuy Bui
(74) *Attorney, Agent, or Firm* — Workman Nydegger

(57) ABSTRACT

The present invention extends to methods, systems, and computer program products for sharing volumes between clustered nodes. Embodiments of the invention include a Clustered Shared Volume File System (CsvFs) that appears to clients as a local file system. The CsvFs communicates to a node where a disk is mounted to coordinate access to files on the disks. CsvFs uses Opportunistic Locks (oplocks) to decide when direct access to a volume is safe. CsvFs can be extended with oplock upgrade mechanisms that allow a coordinating node to tell CsvFs when it is safe to attempt to upgrade oplock. CsvFs also uses a transitivity property of oplocks to be able to grant (delegate) oplocks to clients that are on top of CsvFs.

20 Claims, 8 Drawing Sheets

VOLUMES AND FILE SYSTEM IN CLUSTER SHARED VOLUMES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, a group of nodes (servers) are arranged in a cluster. Within a cluster, if any node fails, other nodes of the cluster can transparently take over the work of the failed server. The other nodes can restart applications and thereby continue serving clients without significant interruption. This operation is generally referred to as failover, or failover clustering.

Failover clustering often implements a "shared-nothing" storage model. That is, each storage unit (e.g., a disk or part thereof) is owned by a single node. Only that node can perform direct input/output (I/O) to that specific storage unit. A storage unit can be referred to by a Logical Unit Number ("LUN"), which exposes one or more volumes.

In this model, application and disk resources are part of a common group (a unit of failover corresponding to a LUN) with an explicit dependency between the application-resource and the disk-resource. This provides some guarantee that disks are brought online before an application starts, and are put offline after the application exits. As a result, clustered applications are constrained to this I/O model, whereby any of the applications that need access to the same disk need to be run on the same cluster node.

Further, an application's failover and restart operation is limited by the time taken for volume dismount and remount. Moreover the shared-nothing model may lead to a high management cost of the attached storage, because of the relatively large number of LUNs that are required in practical usage scenarios. For example, to have somewhat more granular failover when files stored are stored on a SAN (storage area network), numerous LUNs need to be carved out on the SAN. This results at least in part from a need to failover all the applications that depend on the same LUN at the same time. Further, applications that reside on the same LUN cannot failover to different nodes, because only one node has access to the LUN at a given time.

Some clustering technologies coordinate between nodes to provide a non-owner node with direct I/O access to files on a volume. These clustering technologies rely primarily on file opening data (e.g., an access mode and a sharing mode) to determine when direct I/O between a non-owner node and a volume is permitted. However, relying primarily on file opening data to coordinate direct I/O to a file is an overly conservative approach. As a result, non-owner nodes can be relegated to using re-directed I/O to communicate with a volume, even when direct I/O would not result in an actual conflict. Re-directed I/O increases network traffic and potentially reduces response time.

BRIEF SUMMARY

The present invention extends to methods, systems, and computer program products for sharing volumes between clustered nodes. In some embodiments, a computer system shares data with a storage device. The computer system receives a file request for transferring file data between the computer system and a file at the storage device volume. The file request has a file request type indicating that the file request is for one or more of: writing data to the file and reading data from the file.

In response to the file request, an oplock level corresponding to the file is checked. The oplock level indicates the level of caching the computer system is allowed to have. The file request is dispatched in accordance with the oplock level to an appropriate I/O mechanism. The appropriate I/O mechanism is selected from among direct I/O and re-directed I/O. The file data is transferred between the computer system and the storage device volume in accordance with the appropriate I/O mechanism.

In other embodiments, an oplock is delegated to an application. A computer system receives a file open request from an application. The file open request requests opening a file stored on the storage device for transferring file data between the client and the file. The file request has an access mode and a sharing mode. The file access mode indicates one or more of: writing data to the file and reading data from the file. The sharing mode indicates that the access mode is one of: shared or not shared.

The computer system also receives an oplock request for the file from the application. The computer system is identified as having an oplock level corresponding to the file. The oplock level indicates the level of caching the computer system is allowed to have. An appropriate oplock level is formulated for the application based on the identified oplock level and the access mode and sharing mode corresponding to any other of the one or more applications having access to the file. An oplock indicative of the appropriate oplock level is delegated to the application.

In further embodiments, an oplock is upgraded. A file system determines that at least two computer systems have been granted access to a file on a storage device volume. The file system detects that one of the at least two computer systems has closed the file. In response to detecting the close, a file system filter calculates that a remaining computer system included in the at least two computer systems potentially has control of all remaining non-conflicting opens on the file. The file system sends a hint to the remaining computer system to request re-evaluation of the oplock level at the remaining computer system.

The file system receives an oplock request from the remaining computer system subsequent to sending the hint. The file system attempts to obtain the highest oplock level possible for the remaining computer system in response to the oplock request. The file system grants an oplock indicative of the highest oplock level possible for the remaining computing system to the remaining computer system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
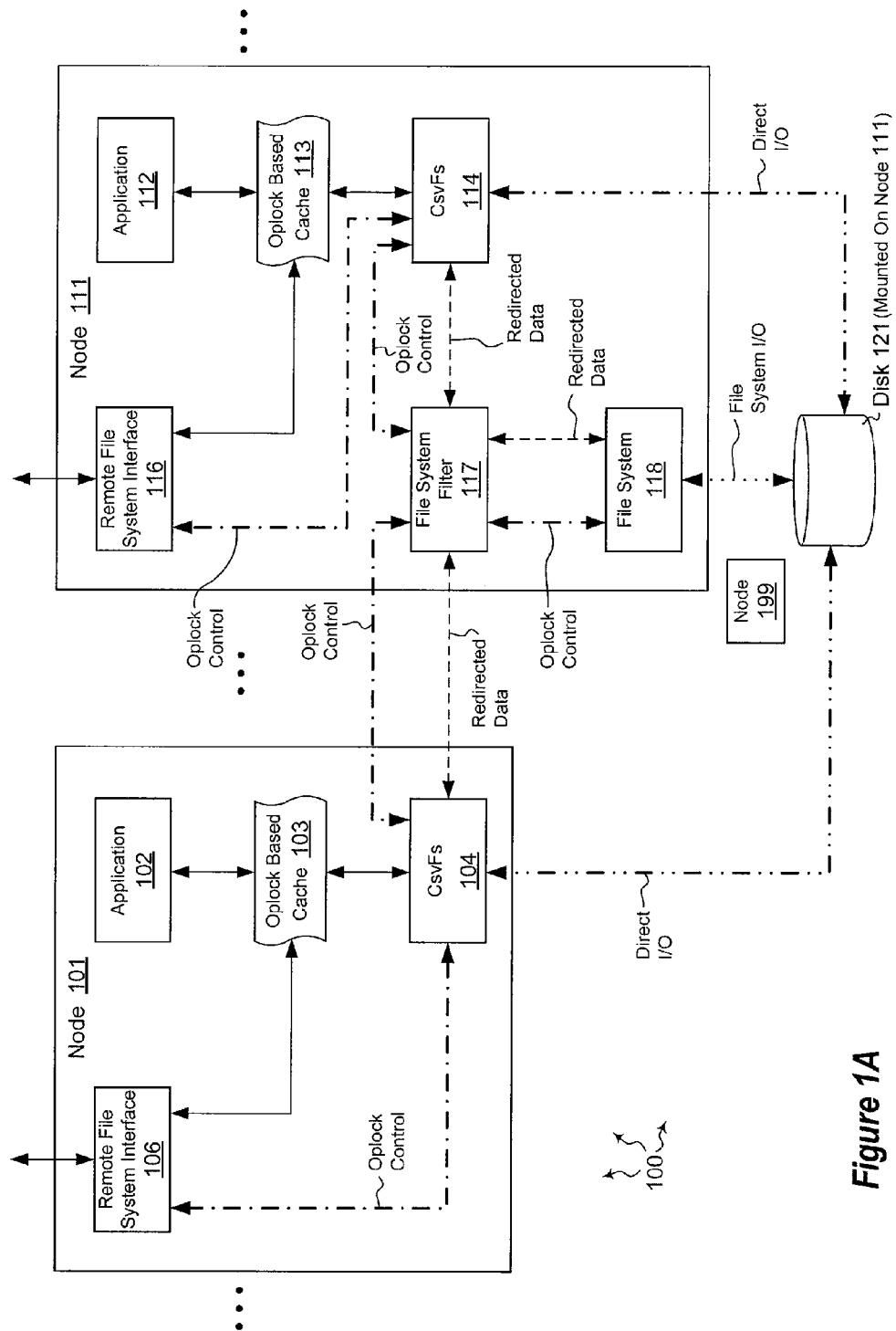
FIG. 1A illustrates an example cluster shared volume architecture that facilitates sharing volumes between clustered nodes.

The present invention extends to methods, systems, and computer program products for sharing volumes between clustered nodes In some embodiments, a computer system shares data with a storage device. The computer system receives a file request for transferring file data between the computer system and a file at the storage device volume. The file request has a file request type indicating that the file request is for one or more of: writing data to the file and reading data from the file.

In response to the file request, an oplock level corresponding to the file is checked. The oplock level indicates the level of caching the computer system is allowed to have. The file request is dispatched in accordance with the oplock level to an appropriate I/O mechanism. The appropriate I/O mechanism is selected from among direct I/O and re-directed I/O. The file data is transferred between the computer system and the storage device volume in accordance with the appropriate I/O mechanism.

In other embodiments, an oplock is delegated to an application. A computer system receives a file open request from an application. The file open request requests opening a file stored on the storage device for transferring file data between the client and the file. The file request has an access mode and a sharing mode. The file access mode indicates one or more of: writing data to the file and reading data from the file. The sharing mode indicates that the access mode is one of: shared or not shared.

The computer system also receives an oplock request for the file from the application. The computer system is identified as having an oplock level corresponding to the file. The oplock level indicates the level of caching the computer system is allowed to have. An appropriate oplock level is formulated for the application based on the identified oplock level and the access mode and sharing mode corresponding to any other of the one or more applications having access to the file. An oplock indicative of the appropriate oplock level is delegated to the application.

In further embodiments, an oplock is upgraded. A file system determines that at least two computer systems have been granted access to a file on a storage device volume. The file system detects that one of the at least two computer systems has closed the file. In response to detecting the close, a file system filter calculates that a remaining computer system included in the at least two computer systems potentially has control of all remaining non-conflicting opens on the file. The file system sends a hint to the remaining computer system to request re-evaluation of the oplock level at the remaining computer system.

The file system receives an oplock request from the remaining computer system subsequent to sending the hint. The file system attempts to obtain the highest oplock level possible for the remaining computer system in response to the oplock request. The file system grants an oplock indicative of the highest oplock level possible for the remaining computing system to the remaining computer system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and the following claims, an "opportunistic lock" or "oplock" is defined as a lock placed on a file (e.g., in a File Allocation Table ("FAT") file system) or a stream (e.g., in a New Technology File System ("NTFS")) to coordinate data caching and coherency between multiple nodes. Within a cluster of a plurality of nodes, a storage device can be mounted at one of the plurality of nodes. The node where storage device is mounted can be viewed as the "coordinating" node for the storage device. Other of the plurality of nodes in the cluster can be viewed as "non-owner" nodes for the storage device.

A non-owner node can request an oplock on data (e.g., a file or portion thereof, such as, for example, a stream) from a coordinating node so the non-owner node can cache data locally (thus reducing network traffic and improving apparent response times). An oplock is "opportunistic" in that the coordinating node grants a requested oplock when conditions (e.g., file access mode in a new file request, file sharing mode in a new file request, existing file access mode, existing file sharing mode, other non-owners using the file, other stream states, etc.) make an oplock possible. The coordinating node can also break an oplock or hint that an oplock upgrade is possible when conditions change subsequent to granting the oplock.

A coordinating node can include other components that function as if at a non-owner node. For example, in FIG. 1A, node 111 is a coordinating node for a volume disk 121. Node 111 also includes cluster shared volume file system ("CsvFs") 114 that functions as a non-owner node with respect to disk 121.

Accordingly, in some embodiments, a plurality of nodes is connected to another over network connections to form a cluster. A disk or portion thereof, such as, for example, a volume, can be mounted at a coordinating node included in the cluster. The coordinating node and other non-owner nodes (as well as components at the coordinating node that functioning as a non-owner node) in the cluster share access to the disk. Thus, from time to time, non-owner nodes (or components) can request oplocks from the coordinating node for files or streams (or other data) stored on the disk. The coordinating node can grant oplocks, hint that an oplock upgrade is possible, and break oplocks to non-owner nodes (and components) as conditions change.

FIG. 1 illustrates an example cluster shared volume architecture 100 that facilitates sharing volumes between clustered nodes. Referring to FIG. 1, cluster shared volume architecture 100 includes node 101, node 111, and node 199. Each of the depicted nodes can represent a computer system and can be connected to one another over (or be part of) a network, such as, for example, a Local Area Network ("LAN"), a Wide Area Network ("WAN"), and even the Internet, to form a cluster. Accordingly, each of the depicted nodes as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, node 111 includes file system 118, file system filter 117, CsvFs 114, application 112, oplock based cache 113, and client interface 116. Disk 121 is mounted on node 111 (thus, node 111 can be viewed as the coordinating node for disk 121). Disk 121 can include or be part of one or more volumes. Each volume can be formatted by a file system, such as, for example, file system 118 (e.g., FAT, NTFS, etc). As such, file system 118 can use Input/Output ("I/O") to transfer data to and from a volume of disk 121.

Generally, file system filter 117 is configured to filter data (re-directed file data and oplock control data) being sent between file system 118 and a CsvFs, such as, for example, one of CsvFs 104 or 114. CsvFs 114 is a file system to other components within node 111, such as, for example, application 112 and to clients communicating with node 111 through remote file system interface 116. CsvFs 114 appears as a local file system to applications within node 111 and at communicating clients. CsvFs 114 can also communicate oplock control data to remote file system interface 116 to delegate oplocks to communicating clients and locally running applications (e.g., application 112).

Based on a granted oplock level for a file or stream, oplock based cache 113 can be used to cache data for a file or stream. A cache can be built up based on an application's I/O. A heuristic can be used to attempt to predict what data and application might next touch and read-ahead. Another function is write-behind where data first goes to cache and then a lazy writer writes data to disk in larger chunks.

Based on a granted oplock level for a file or stream, CsvFs 114 can also determine to transfer file data between node 111 and disk 121 using direct I/O or re-directed I/O. Generally, when an oplock level permits a dirty cache (i.e., not flushed), such as, for example, a Read/Write ("RW") or Read/Write/Handle ("RWH") level, data can be written and read directly to/from the disk. When an oplock level permits a non-dirty cache, such as, for example, a R and RH level, data is read directly from disk, but write data is redirected. When a Write ("W") oplock is lost and an oplock downgraded to R or RH, the cache can be flushed (but not necessarily purged). Further, when an oplock level permits a non-dirty (or write-through) cache, such as, for example, Read ("R") or Read/Handle ("RH"), data can be read directly from the disk (while writes are to be redirected). When a R oplock is lost, the cache can be purged, no further data cached, and I/O (reads and writes) are redirected.

As depicted, node 101 includes CsvFs 104, application 102, oplock based cache 103, and remote file system interface 106. CsvFs 104 is a file system to other components within node 101, such as, for example, application 102 and to clients communicating with node 101 through remote file system interface 106. Although remote from file system 118, CsvFs 104 appears as a local file system to applications within node 101 and at communicating clients. CsvFs 104 can also communicate oplock control data to remote file system interface 106 to delegate oplocks to communicating clients and locally running applications (e.g., application 102).

Based on a granted oplock level for a file or stream, oplock based cache 103 can be used to cache data from the file or steam. Cache 103 can operate similarly to cache 113. Based on a granted oplock level, CsvFs 104 can also determine to transfer file data between node 101 and disk 121 using direct I/O or re-directed I/O. Rules for determining when to transfer data using direct or redirected I/O can be similar to those used at CsvFs 114. Node 199 can include components similar to those depicted in node 101. For example, node 199 can include a CsvFs, an oplock based cache, and an application. If node 199 communicates with other clients, node 199 can also include a remote file system interface. If a disk is mounted at node 199, node 199 can include a file system and file system filter. Each of these components can have functions as previously described with respect to node 101 and/or node 111.

When a disk is mounted at node 199, other nodes can include an additional CsvFs to communicate with the disk.

The ellipses in FIG. 1A represent that one or more other nodes can also be included cluster shared volume architecture 100. These one or more other nodes can also include any of a file system, a file system filter, a file system proxy, an oplock based cache, an application, and a client interface as previously described.

Figure 1B:
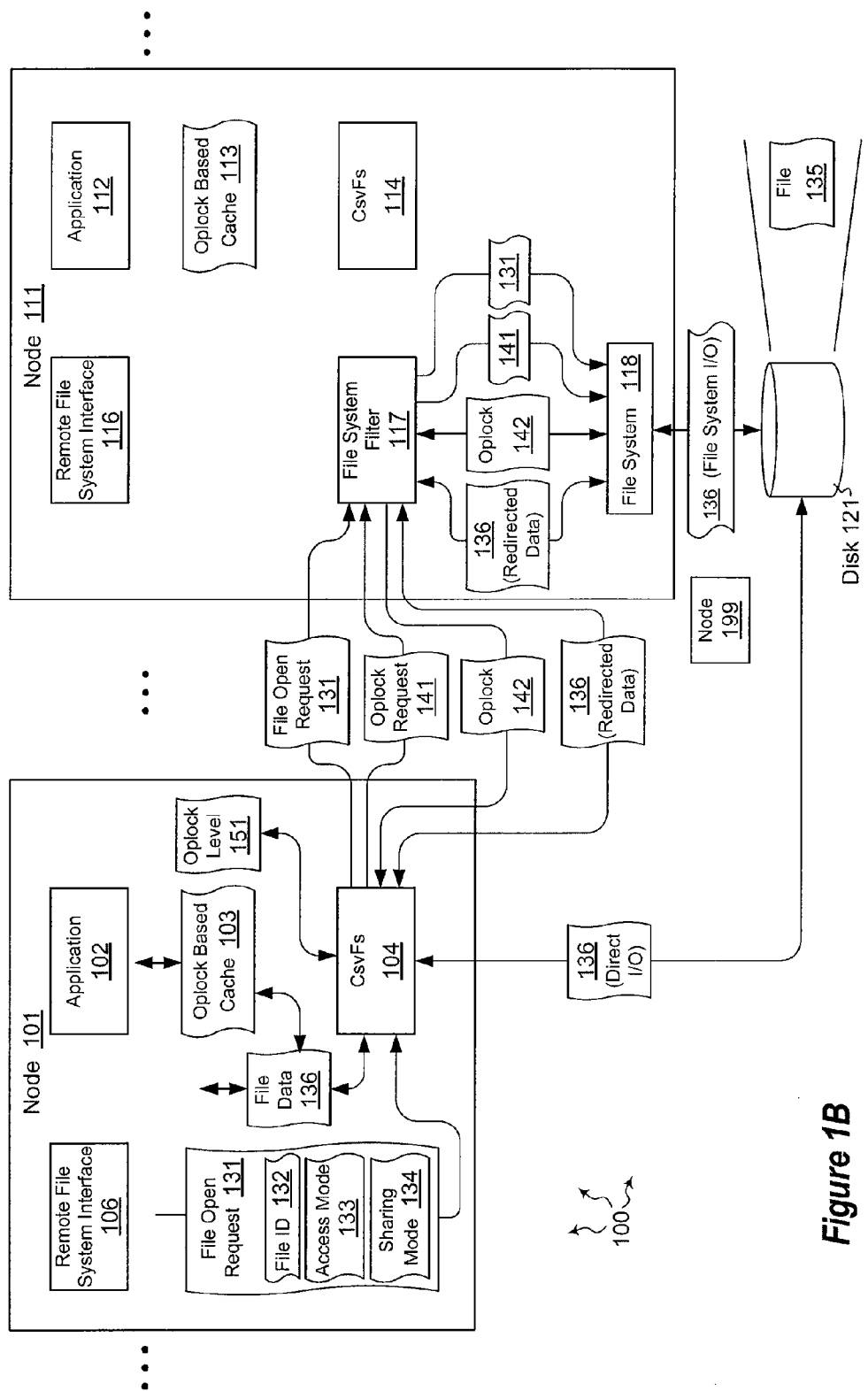
FIG. 1B illustrates an additional view of components from the example cluster shared volume cluster shared volume architecture of FIG. 1A.

Generally, embodiments of the invention including using oplocks to decide when it is safe to allow a remote client to perform local caching and the kind of local caching that is allowed. A CsvFs receives a RW oplock from a file system at a coordinating node. Based on the oplock, the CsvFs determines that local caching corresponding to the RW oplock is permitted. Further based on the RW oplock, the CsvFs also sends Reads and Writes directly to the disk. When a CsvFs receives a R oplock, the CsvFs determines that local caching corresponding to the R oplock is permitted. Further, based on the R oplock, the CsvFs performs Read I/Os directly (i.e., direct I/O) from the disk while it sends writes to the coordinating node (i.e., redirected data). When an oplock is broken, caching is not performed and reads and writes are sent (redirected) to the coordinating node FIG. 1B illustrates an additional view of components from cluster shared volume architecture 100. As depicted in FIG. 1B, application 102 or a client communicating with node 101 through remote file system interface 106 can send file open request 131 to CsvFs 104. File open request 131 includes file ID 132 (an ID for file 135), access mode 133 (e.g., Read and/or Write), and sharing mode 134 (e.g., shared or non-shared). Thus, file open request 131 is a request to open file 135 in an access mode specified by 133 and a sharing mode specified by 134. CsvFs 104 forwards file open request 131 to file system filter 117. File system filter 117 can forward file open request 131 to file system 118. File system 118 can determine if file 135 can be opened with access mode 133 and sharing mode 134 based on the access mode and sharing mode associated with other components that have file 135 opened. When file 135 can be opened as requested, file system 118 returns a file handle to CsvFs 104.

CsvFs 104 also sends oplock request 141 to file system filter 117. Oplock request 141 can be a request for an oplock level that permits data from file 135 (or a stream) (e.g., read data and/or write data) to be cached in oplock based cache 103. File system filter 117 can forward oplock request 141 to file system 118. File system 118 can determine what level of oplock (if any) can be granted to node 101. The oplock level granted to node 101 can be determined based on access mode 133, sharing mode 134, access modes and sharing modes associated with other components that have file 135 opened, other stream states (e.g., presence of byte range locks on a stream from other systems) and how the other components are actually accessing file 135. For example, file system 118 can grant oplock 142 (e.g., for read and/or write data) to node 101. File system filter 117 can forward oplock 142 to CsvFs 104. Based on the grant of oplock 142, node 101 can have oplock level 151 (e.g., read and/or write oplock) in file 135.

Based on oplock level 151, CsvFs 104 can cache file data for file 135 (e.g., file data 136) in oplock based cache 103. Based on oplock level 151, CsvFs 104 can also determine whether direct I/O or redirected I/O is to be used to transfer file data (e.g., file data 136) between node 101 and disk 121.

Figure 2:
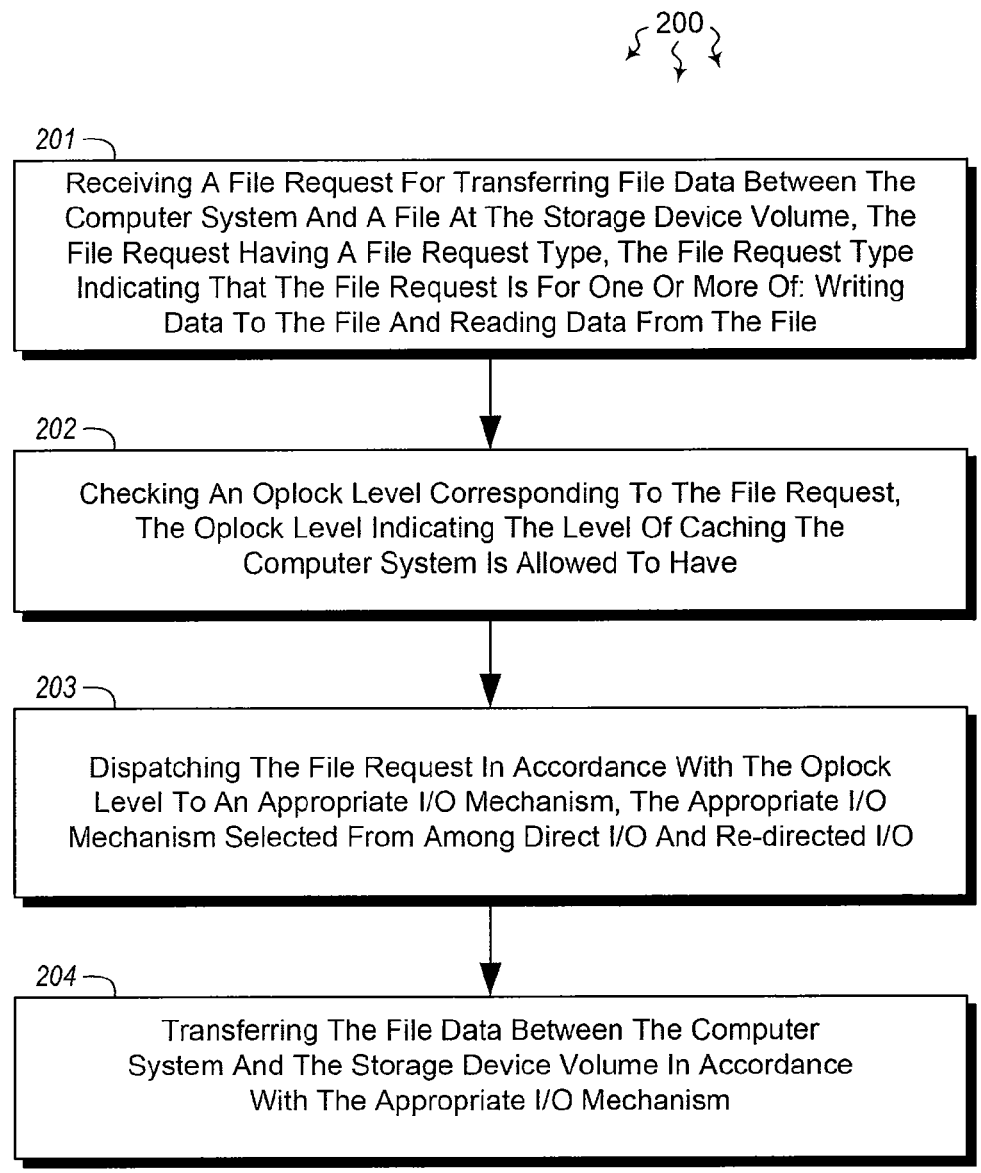
FIG. 2 illustrates a flow chart of an example method for sharing volumes between clustered nodes.

FIG. 2 illustrates a flow chart of an example method 200 for transferring data between the computer system and the storage device volume. Method 200 will be described with respect to the components and data of cluster shared volume architecture 100 depicted in FIG. 1B.

Method 200 includes an act of receiving a file request for transferring file data between the computer system and a file at the storage device volume, the file request having a file request type, the file request type indicating that the file request is for one or more of: writing data to the file and reading data from the file (act 201). For example, CsvFs 104 can receive a request to transfer file data 136 between node 101 and file 135 on a volume of disk 121. The file request can include a file request type indicating whether file data 136 is to be written to and/or read from file 135.

Method 200 includes an act of checking an oplock level corresponding to the file request, the oplock level indicating the level of caching the computer system is allowed to have (act 202). For example, CsvFs 104 can check oplock level 151 for CsvFs 104 in response to oplock request 141. Oplock level 151 indicates a permitted caching level for node 101.

Method 200 includes an act of dispatching the file request in accordance with the oplock level to an appropriate I/O mechanism, the appropriate I/O mechanism selected from among direct I/O and re-directed I/O (act 203). For example, CsvFs 104 can determine if direct I/O or re-directed I/O is the appropriate I/O mechanism for transferring file data 136 between node 101 and disk 121. The determination is made based on oplock level 151 and whether data 136 is read data and/or write data. Direct I/O can be selected when oplock level 151 represents that direct I/O is safe (e.g., data coherency is maintained for nodes in the cluster) for reading data from and/or writing data to file 135. On the other hand, re-directed I/O can be selected when oplock level 151 represents that direct I/O is possibly not safe (e.g., data coherency is potentially violated for one or more nodes in the cluster) for reading data from and/or writing data to file 135.

Method 200 includes an act of transferring the file data between the computer system and the storage device volume in accordance with the appropriate I/O mechanism (act 204). For example, file data 136 can be transferred directly between node 101 and disk 121 when oplock level 151 represents that direct I/O is safe. On the other hand, the transfer of file data 136 between node 101 and disk 121 can be re-directed through file system filter 117 and file system 118 when oplock level 151 represents that direct I/O is possibly not safe. File system I/O can be used to transfer file data 136 between file system 118 and disk 121 during re-direction.

In some embodiments, one or more clients are connected to a clustered node. A client can leverage a CsvFs within a node to transfer file data between the client and disk. For example, a node can be accessed by remote clients. A CsvFs can appear as a local file system to the remote clients. Since a CsvFs appears as a local file system, remote clients may attempt to get an oplock from the CsvFs. A CsvFs can grant an oplock to a remote client based on the oplock level it received from a coordinating node. For example, when a CsvFs has a RW oplock, the CsvFs can grant (delegate) remote clients a R oplock or a RWoplock. On the other hand, when a file system proxy has a R oplock, the file system proxy can grant (delegate) a R oplock.

If a CsvFs loses an oplock (i.e., the oplock is broken), the CsvFs breaks all oplocks granted (delegated) to remote clients prior to confirming oplock break back to a coordinating node. The CsvFs can also downgrade a buffering level to match a new oplock level. For example, it may be that a CsvFs has a RW oplock and the file system proxy has granted (delegated) a remote client a RW oplock. If a coordinating node then tells the file system proxy to downgrade the oplock to a R oplock, the CsvFs first communicates with the remote client to downgrade the delegated oplock to a R oplock. Once the remote client confirms oplock downgrade, the CsvFs changes local caching mode to non-dirty or write-through cache, and then confirms oplock downgrade back to the coordinating node.

Figure 1C:
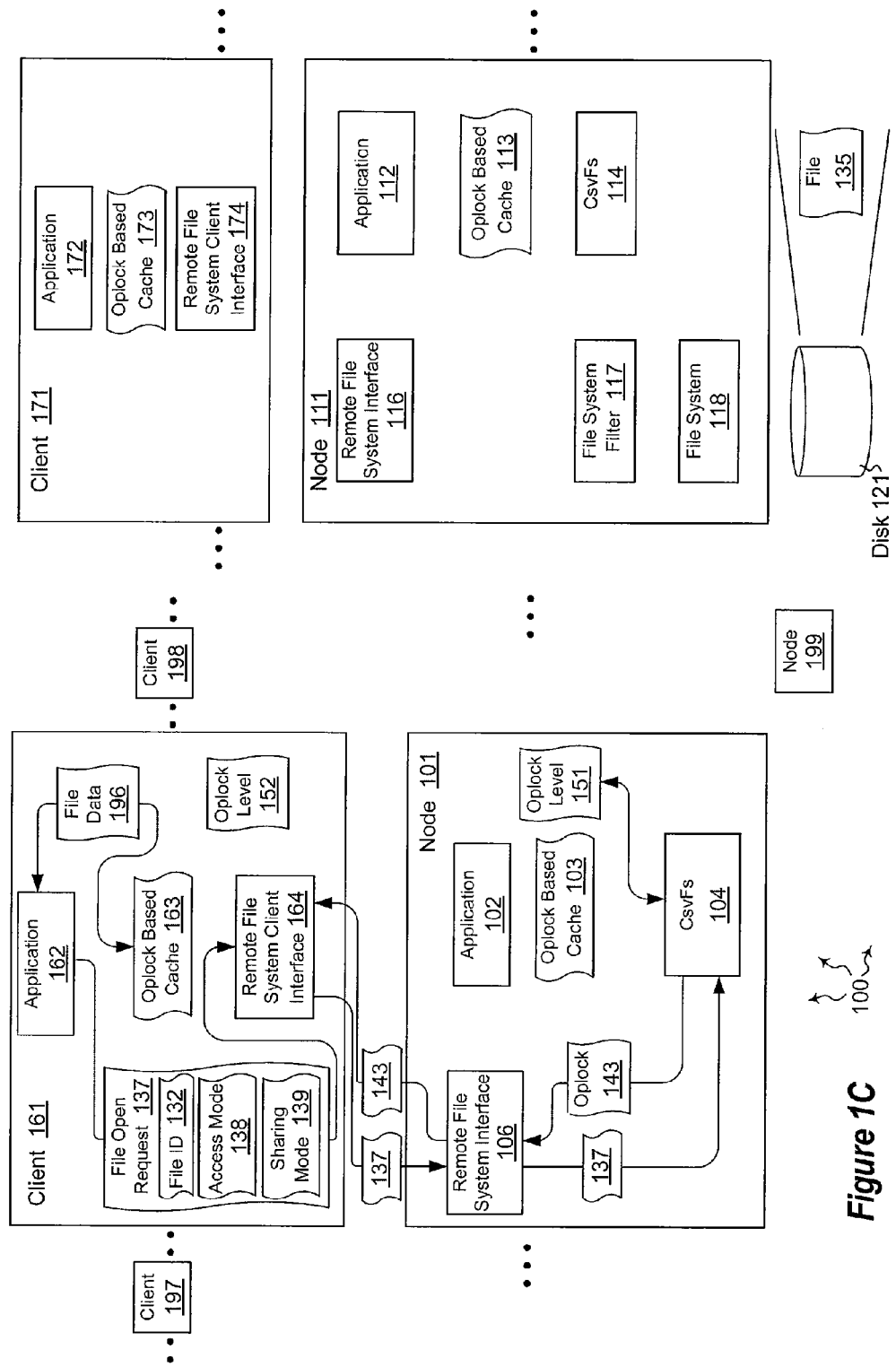
FIG. 1C illustrates an additional view of components from the example cluster shared volume cluster shared volume architecture of FIG. 1A.

FIG. 1C illustrates an additional view of components from cluster shared volume architecture 100. As depicted in FIG. 1C, client 161 includes application 162, oplock based cache 163, and remote file system client interface 164 (e.g., a Server Message Bus ("SMB") redirector or a Samba client). Client 161 can use remote file system client interface 164 to communicate with node 101 (through remote file system interface 106). Thus, client 161 can send file open requests to and exchange file data with volumes on disk 121 through CsvFs 104. Based on a granted oplock level for a file (or stream), oplock based cache 163 can be used to cache read-ahead and/or write data for the file at client 161.

Other clients, including clients 197 and 198, can also be connected to and communicate with node 101.

Further clients can be connected to other nodes. For example, one or more clients, including client 171, can be connected to node 111. As depicted, client 171 includes application 172, oplock based cache 173, and remote file system client interface 174. Client 171 can use remote file system client interface 174 to communicate with node 111 (through remote file system interface 116). Thus, client 171 can send file open requests to and exchange file data with disk 121 through CsvFs 114. Based on a granted oplock level for a file, oplock based cache 173 can be used to cache read-ahead and/or write data for the file at client 171.

Upon receiving an oplock request for a file (or stream) from a client, a CsvFs can determine if it has been granted an oplock (from a file system) for the file (or stream). If so, the CsvFs can then determine if some or all of granted oplock can be delegated to the requesting client.

Figure 3:
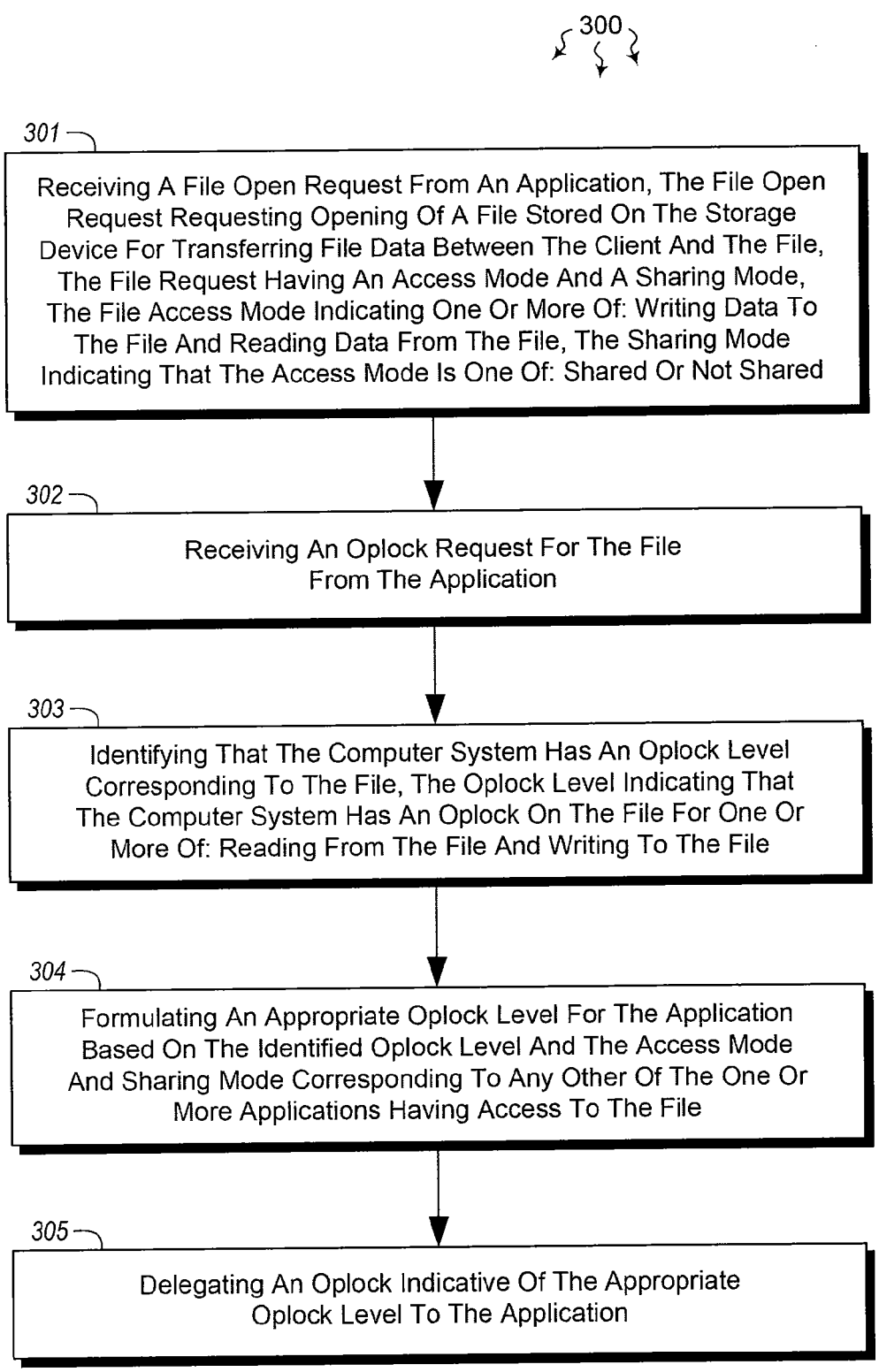
FIG. 3 illustrates a flow chart of an example method for delegating an oplock to a client.

FIG. 3 illustrates a flow chart of an example method 300 for delegating an oplock to a client. Method 300 will be described with respect to the components and data of cluster shared volume architecture 100 depicted in FIG. 1C.

Method 300 includes an act of receiving a file open request from an application the file open request requesting opening of a file stored on the storage device for transferring file data between the client and the file, the file request having an access mode and a sharing mode, the file access mode indicating one or more of: writing data to the file and reading data from the file, the sharing mode indicating that the access mode is one of: shared or not shared (act 301). For example, CsvFs 104 can receive file open request 137 from application 162.

File open request 137 includes file ID 132 (an ID for file 135), access mode 138 (e.g., Read and/or Write), and sharing mode 139 (e.g., shared or non-shared). Thus, file request 137 is a request to open file 135 in an access mode specified by 138 and a sharing mode specified by 139. CsvFs 104 forwards request 137 to file system filter 117. File system filter 117 can forward file open request 137 to file system 118. File system 118 can determine if file 135 can be opened with access mode 138 and sharing mode 139 based on the access mode and sharing mode associated with other components that have file 135 opened.

Method 300 includes an act of receiving an oplock request for the file from the application (act 302). For example, node 101 can receive an oplock request from application 162. The oplock request can correspond to file 135.

Method 300 includes an act of identifying that the computer system can be granted an oplock level corresponding to the file, the oplock level indicating that the computer system has an oplock on the file for one or more of: reading from the file and writing to the file (act 303). For example, CsvFs 104 can determine that it has oplock level 151 corresponding to file 135. Oplock level 151 indicates that node 101 has an oplock (e.g., R or RW) for reading data from file 135 and/or writing data to file 135.

Method 300 includes an act of formulating an appropriate oplock level for the application based on the identified oplock level and the access mode and sharing mode corresponding to any other of the one or more applications having access to the file (act 304). For example, CsvFs 104 can formulate oplock level 152 for client 161 based on oplock level 151 and the access mode and sharing mode any other clients (e.g., 197, 198) connected to node 101 have on file 135. Method 300 includes an act of delegating an oplock indicative of the appropriate oplock level to the application (act 305). For example, CsvFs 104 can delegate oplock 143 to client 161 in response to the oplock request from application 162. Oplock 143 is indicative of oplock level 152. Node 101 can send oplock 143 to client 161.

Client 161 can store oplock level 152. Upon a further request to transfer file data between client 161 and file 135, client 161 can refer to oplock level 152 to determine if the file data can be cached in oplock cache 163. For example, upon a request to transfer file data 196, client 161 can determine that oplock level 152 permits caching file data 196 in oplock based cache 163. File data cached in oplock based cache 163 can eventually be transferred to node 101. At node 101, the file data can also be cached in oplock based cached 103 before transfer between node 101 and disk 121.

A node can delegate all or less than all of a granted oplock to one or more of connected clients. For example, when a node has a RW oplock, the node can delegate a R oplock or a RW oplock to a requesting client. When a node has a R oplock, the node can delegate a R oplock to a requesting client.

Figure 1D:
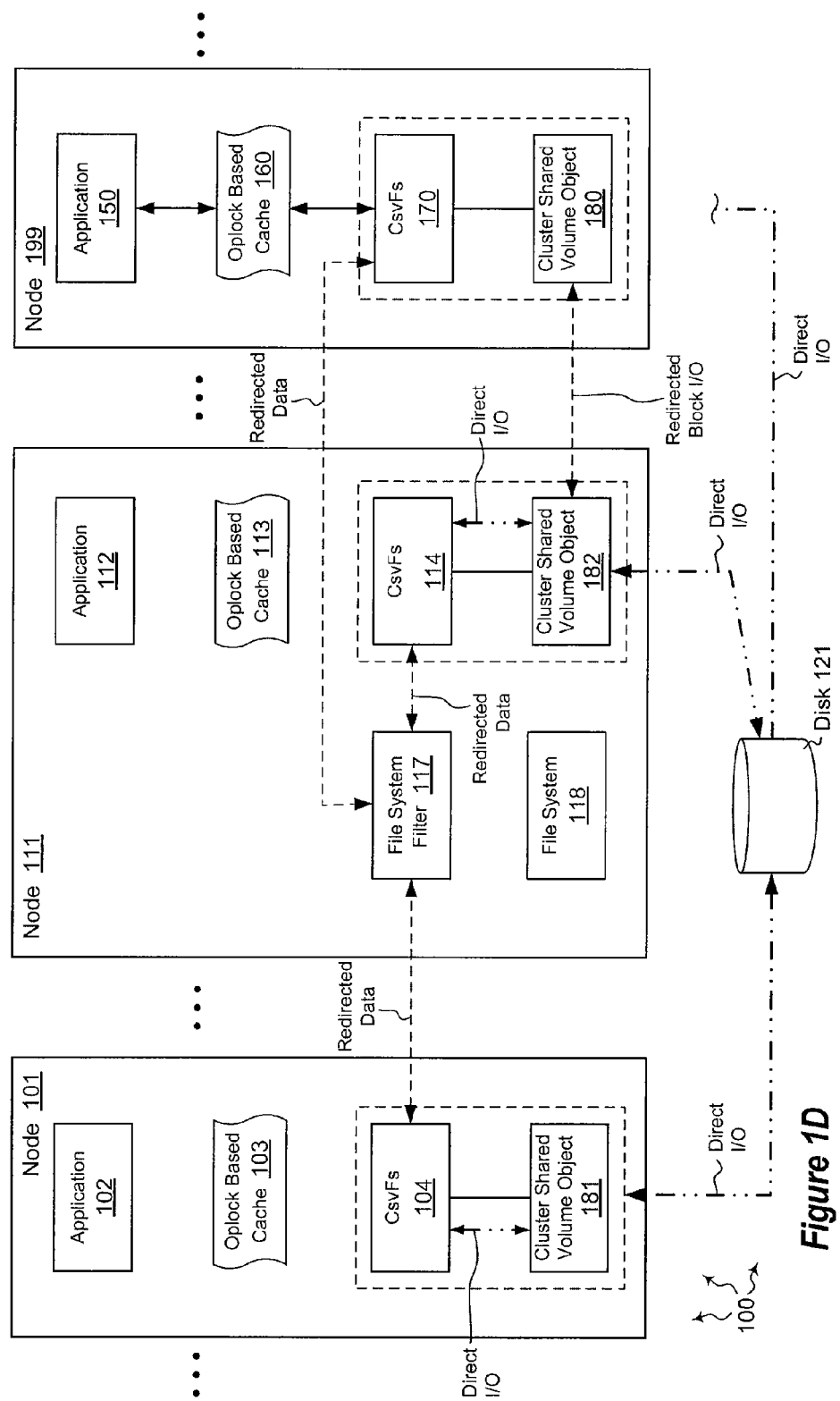
FIG. 1D illustrates an additional view of components from the example cluster shared volume cluster shared volume architecture of FIG. 1A.

FIG. 1D illustrates an additional view of components from cluster shared volume architecture 100. As depicted in FIG. 1D, node 101 further includes cluster shared volume object 181, node 111 further includes cluster shared volume object 182. Node 199 includes application 150, oplock based cache 160, CsvFs 170, and cluster shared volume object 180. In general, a cluster shared volume object can be loaded at a node to virtualize access to a physical volume. For example, and cluster shared volume object 180, 181, and 182 virtualized access to a volume at disk 121.

Volume virtualization facilitates block level I/O fault through redirection of block level 10 from a cluster shared volume object to a node where a disk is attached. For example, cluster shared volume object 180 can redirect block I/O to node 111. A cluster shared volume object can also retry I/O on failures.

Volume virtualization also facilitates file system fault tolerance by detaching a file system lifetime from the lifetime, location, and presence of a direct connection to a physical volume. For example, cluster shared volume object 180 can continue to appear as a volume to other components even when direct I/O to disk 121 is not available. When direct I/O to disk 121 is not available, data and/or block I/O data can be redirected to node 111. When direct I/O to disk 121 again becomes available, direct I/O can be used when appropriate (e.g., based on oplock level)

A CsvFS can be mounted on a cluster shared volume object to provide file system functionality. A CsvFS mounted on a cluster shared volume object appears as a local file system to other components. For example, application 150 can view CsvFs 170 as a local file system. Appearance as a local file system facilitates seamless integration with operating system O/S backup and restore. Appearance as a local file system also permits the use of tools that work with local file systems, such as, for example, defrag, format, check disk, disk management, etc. Appearance as a local file system also gives applications the ability to access CsvFs using a remote file system interface (e.g., SMB or Network File System ("NFS"))

Volume virtualization also provides a symmetrical namespace on all nodes even on the nodes that do not have a direct connected to the disk. Mounting a CsvFS on a cluster shared volume object CsvFs enables end-to-end namespace control. Thus, CsvFs 170 CsvFs can control a namespace without having to depend on the state of disk 121.

Thus, within cluster shared volume architecture 100, fault tolerant access can be provided to a storage device volume independent of connection types that are available. For example, CsvFs 170 can receive a file request from application 150 for transferring file data (possibly data in oplock based cache 160) between node 199 and a file at a volume of disk 121. Cluster shared volume object 180 can detect that direct I/O to disk 121 is available. Accordingly, the file data can be transferred between node 199 and the volume of disk 121 using direct I/O.

After transferring the file data, direct I/O from node 199 to disk 121 can be lost (either intentional due to user operations or through a failure). Subsequently, CsvFs 170 can receive a second file request from application 150 for transferring second file data (possibly data in oplock based cache 160) between node 199 and a file at a volume of disk 121. Cluster shared volume object 180 can detect that direct I/O to disk 121 is not available. Accordingly, the file data can be transferred between node 199 and the volume of disk 121 using re-directed I/O.

Although different I/O mechanisms were used due to the unavailability of direct I/O, CsvFs 170 continued to appear as a functioning local file system to application 150.

For example, file system 118 can be dismounted with an intent to re-mount file system 118 at node 101. Alternately, file system 118 can be dismounted because of a failure. Cluster shared volume object 180 permits CsvFs 170 CsvFs to survive a dismount of file system 118. Thus, the combination of CsvFs 170 and cluster shared volume object 180 also appear to continue as a local file system to other components when file system 118 is dismounted. When file system 118 is remounted (at node 101 or node 111) it can again be used.

In some embodiments, an oplock upgrade mechanism hints to a CsvFs when an upgraded oplock may be available. A hint can be sent for a file when a file system (e.g., 118) detects that the CsvFs (e.g., 104) has the remaining opens on the file (e.g., as a result of another component, such as, for example, 114, closing the file). Upon receiving a hint, the CsvFs (e.g., 104) can send an oplock request for the file to the file system (e.g., 118). Upon receiving the oplock request, the file system (e.g., 118) re-evaluates the oplock level for the CsvFs (e.g., 104). This essentially facilitates re-evaluation of an oplock when a file close occurs.

Figure 1E:
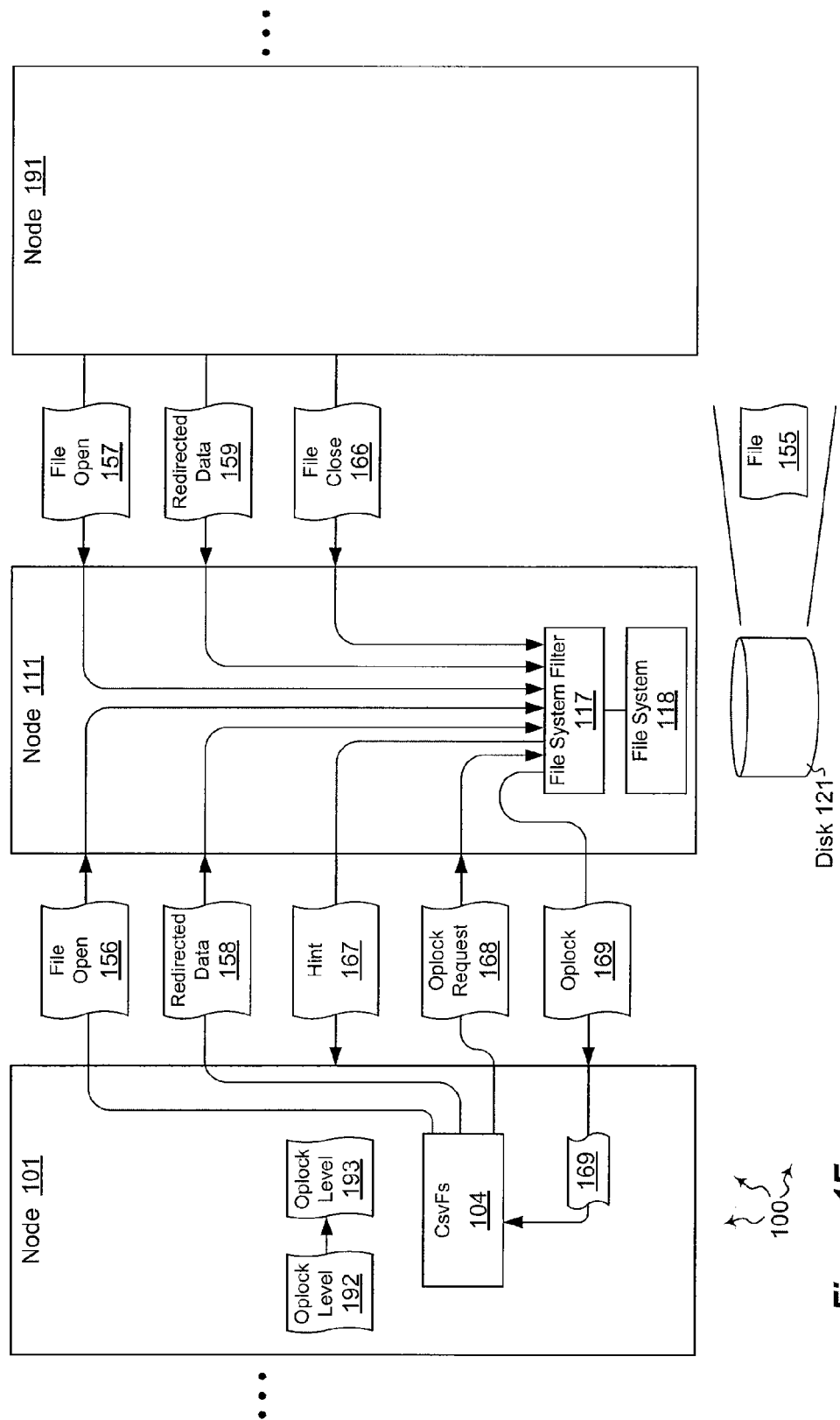
FIG. 1E illustrates an additional view of components from the example cluster shared volume cluster shared volume architecture of FIG. 1A.

FIG. 1E illustrates an additional view of components from cluster shared volume architecture 100. As depicted in FIG. 1E, node 101 and node 191 are in communication with file system 118 to transfer file data to and from disk 121. Node 101 has oplock level 192 for file 155. Oplock level 192 can represent that node 101 has no oplock, has a R oplock, or has a RW oplock for file 155.

Figure 4:
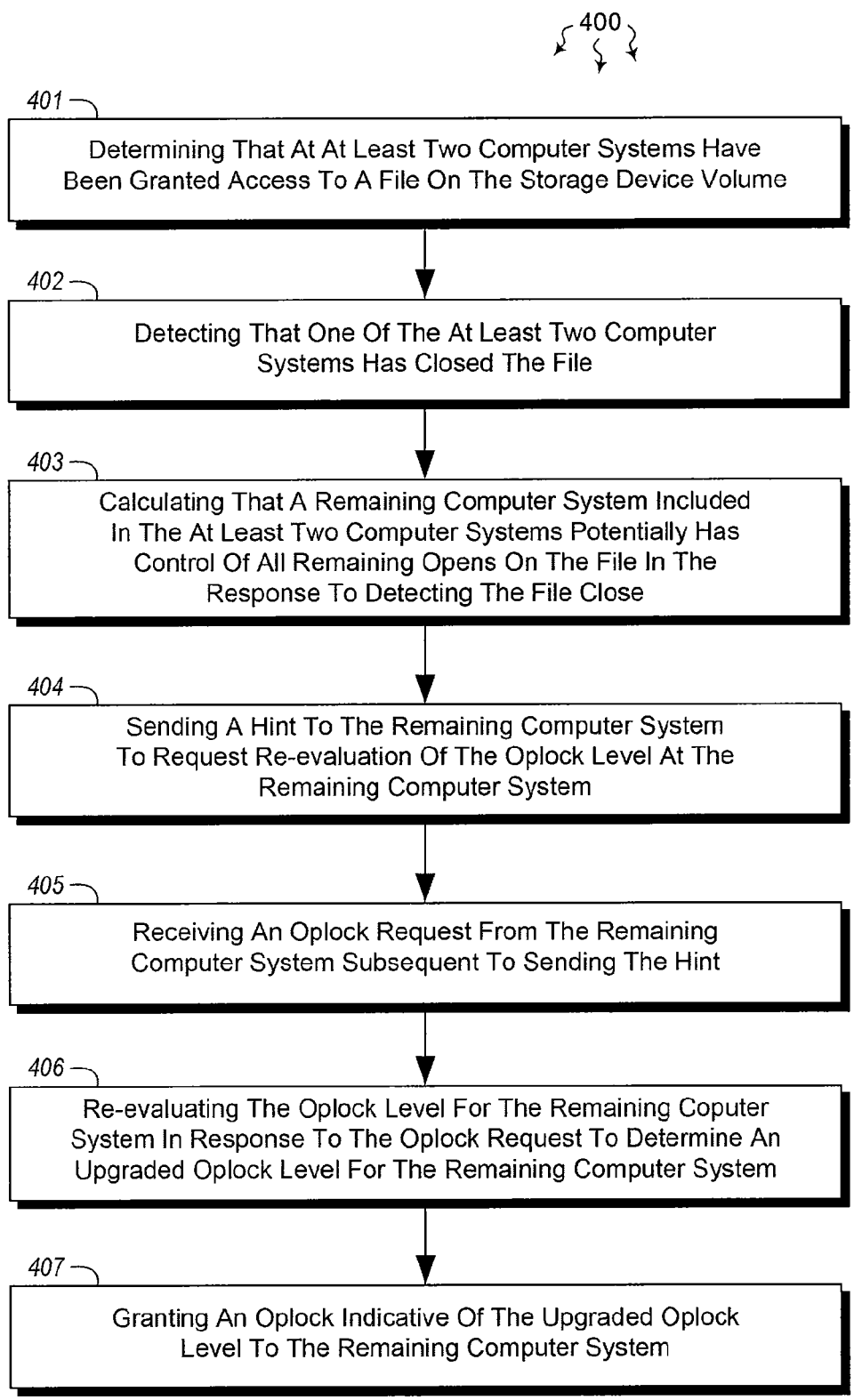
FIG. 4 illustrates a flow chart of an example method for providing an upgraded oplock level to a computer system.

FIG. 4 illustrates a flow chart of an example method 400 for providing an upgraded oplock level to a computer system. Method 400 will be described with respect to the components and data of cluster shared volume architecture 100 depicted in FIG. 1E.

Method 400 includes an act of determining that at least two computer systems have been granted access to a file on the storage device volume (act 401). For example, node 101 can send file open 156 to file system filter 117 to open file 155. Redirected data 158 can then be transferred between node 101 and file 155. Likewise, node 191 can send file open 157 to file system filter 117 to open file 155. Redirected data 159 can then be transferred between node 191 and file 155. As such, file system 118 can determine that both node 101 and node 191 have been granted access to file 155.

Method 400 includes an act of detecting that one of the at least two computer systems has closed the file (act 402). For example, node 191 can send file close to file system 118. Accordingly, file system filter 117 can observes that node 191 has closed file 155. Method 400 includes an act of calculating that a remaining computer system included in the at least two computer systems potentially has control of all remaining opens on the file in the response to detecting the file close (act 403). For example, file system 118 can calculate that node 101 potentially has control of any remaining opens on file 155 in response to detecting file close 166.

In response to the file close, file system filter 117 can determine if an upgrade hint is to be sent to CsvFs 104. If CsvFs 104 currently has an oplock level on file 155 that does not allow direct I/O for both read and write data, there is a potential to upgrade the oplock on file 155 for file system proxy 104. For example, if CsvFs 104 has no oplock on file 155 there is a potential to upgrade to a R oplock or a RW oplock on file 155. If CsvFs 104 has a R oplock on file 155 there is a potential to upgrade the R oplock to a RW oplock. When there is a potential to upgrade an oplock, file system 188 can send an upgrade hint to CsvFs 104.

On the other hand, if CsvFs 105 has an oplock level that does allow direct I/O for both read and write data, there is essentially no potential to upgrade. When there is no potential to upgrade, file system filter 117 does not send a hint to CsvFs 104.

Method 400 includes an act of sending a hint to the remaining computer system to request re-evaluation of the oplock level at the remaining computer system (act 404). For example, file system filter 117 can send hint 167 to node 101. Hint 167 can indicate to node 101 to re-request an oplock for file 155. Node 101 can receive hint 167.

Method 400 includes an act of receiving an oplock request from the remaining computer system subsequent to sending the hint (act 405). For example, CsvFs 104 can send oplock request 168 to file system 118. File system 118 can receive oplock request 168 from CsvFs 104. Oplock request 168 can request an oplock on file 155 that, if granted, increases oplock level 192.

Method 400 includes an act of re-evaluating the oplock level for the remaining computer system in response to the oplock request to determine an upgraded oplock level for the remaining computer system (act 406). For example, file system 118 can re-evaluate oplock level 192 in response to oplock request 168 to determine an upgraded oplock level for node 101. An upgraded oplock level can increase oplock level 192 to a R oplock or RW oplock for file 155

Method 400 includes an act of granting an oplock indicative of the upgraded oplock level of the remaining computer system (act 407). For example, file system 118 can send oplock 169 to CsvFs 104. In response to receiving oplock 169, CsvFs 104 can transition (upgrade) oplock level 192 to oplock level 193. Thus, if oplock level 192 indicated no oplock for file 155, oplock level 193 can indicate a R oplock and/or a RW oplock for file 155. If oplock level 192 indicated a R oplock for file 155, oplock level 193 can indicate a RW oplock for file 155. Accordingly, an oplock level for a file at one node is upgraded in response to another node closing the file.

Optionally, another different mechanism can be used to detect when it is safe to upgrade to a read oplock level. A read oplock level can be broken whenever another system performs I/O that conflicts with R oplock (e.g., byte range lock, write or another I/O equivalent to write [zero range, write offload etc], file size changes etc). After the conflicting I/O completes, a CsvFs can again request an R oplock level. The R oplock level can be granted and then broken on a next conflicting I/O. A delay can be introduced to regulate when a CsvFs can again request an R oplock level after a prior R oplock level was broken. The delay can mitigate the load (which can be heavy) that results from repetitive breaking and re-requesting of the R oplock level. The delay can be monitored by a file system filter (e.g., 118).

Embodiments of the invention include a Clustered Shared Volume File System (CsvFs) that looks to the clients as a local file system. The CsvFs communicates to the node where a disk is mounted to coordinate access to the file. CsvFs uses Oportunistic Locks (oplocks) to decide when it is safe to access the volume for read or write directly without sending the data to the node where the volume is mounted. CsvFs is extended with oplock upgrade mechanisms that allow a coordinating node to tell CsvFs when it is safe to attempt to upgrade oplock in case when oplocks were lost. CsvFs also uses a transitivity property of Oplocks to be able to grant (delegate) oplocks to the clients that are on top of CsvFs based on what oplocks CsvFs got from the coordinating node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system being clustered with one or more other computer systems, the computer system and the one or more other computer systems having shared access to a storage device volume mounted at one of the clustered computer systems, a file system for the storage device volume exposed at the one of the clustered computer systems, a method for transferring data between the computer system and the storage device volume, the method comprising:

an act of a cluster shared volume file system (CsvFS) at the computer system receiving a file request for transferring file data between the computer system and a file at the storage device volume,
wherein the CsvFS is connected to the storage device volume to facilitate direct I/O between the computer system and the storage device volume, and the CsvFS is also connected to a file system filter at the one of the clustered computer systems to facilitate re-directed I/O between the computer system and the storage device volume through the file system filter, and
wherein the file request has a file request type, the file request type indicating that the file request is for one or more of: writing data to the file or reading data from the file;
an act of the CsvFS identifying an oplock level corresponding to the file, the oplock level indicating a permitted caching level;
an act of the CsvFS determining an appropriate I/O mechanism for transferring the file data between the computer system and the storage device volume based on the identified oplock level and the file request type, the appropriate I/O mechanism selected from among:
direct I/O between the computer system and the storage device volume for both reads and writes when the oplock level comprises a read/write oplock level, and
direct I/O between the computer system and the storage device volume for reads and re-directed I/O through the file system filter for writes when the oplock level comprises a read oplock level; and
an act of the CsvFS transferring the file data between the computer system and the storage device volume in accordance with the appropriate I/O mechanism.

2. The method as recited in claim 1, wherein the act of the CsvFS determining the appropriate I/O mechanism for transferring the file data between the computer system and the storage device volume comprises act of determining that direct I/O is the appropriate I/O mechanism.

3. The method as recited in claim 2, wherein the act of the CsvFS transferring the file data between the computer system and the storage device volume in accordance with the appropriate I/O mechanism comprises an act of using direct I/O to transfer the file data through a shadow volume object to the storage device volume.

4. The method as recited in claim 1, wherein the act of the CsvFS determining the appropriate I/O mechanism for transferring the file data between the computer system and the storage device volume comprises act of determining that re-directed I/O is the appropriate I/O mechanism.

5. The method as recited in claim 4, wherein the act of the CsvFS transferring the file data between the computer system and the storage device volume comprises an act of using re-directed I/O to transfer file data between the computer system and the file system filter at the one of the clustered computer systems.

6. The method as recited in claim 4, wherein the act of the CsvFS using re-directed I/O to transfer data between the computer system and the file system filter comprises an act of using re-directed I/O to transfer read data, the method further comprising:
   an act of receiving a hint to upgrade to an read oplock, the hint indicative of going a defined period of time without any I/O on the file breaking an read oplock.

7. The method as recited in claim 4, wherein the act of the CsvFS using re-directed I/O to transfer data between the computer system and the file system filter comprises an act of using re-directed I/O to transfer write data, the method further comprising:
   an act of receiving a hint to upgrade to a read/write oplock, the hint indicative of all opens on the file being from the computer system.

8. The method as recited in claim 1, wherein the act of the CsvFS receiving a file request for transferring file data between the computer system and a file at the storage device volume comprises an act of receiving a file request from an application at the computer system that views the CsvFS as a local file system.

9. The method as recited in claim 1, wherein the act of the CsvFS receiving a file request for transferring file data between the computer system and a file at the storage device volume comprises an act of receiving a file request from an application at a remote client of the computer system, the remote client accessing the CsvFS through a remote file system interface.

10. At a computer system including one or more processors and system memory, the computer system being clustered with one or more other computer systems, the computer system and the one or more other computer systems having shared access to a storage device volume mounted at one of the clustered computer systems, a file system for the storage device volume exposed at the one of the clustered computer systems, a method for delegating an oplock to a client, the method comprising:
   an act of a cluster shared volume file system (CsvFS) at the computer system receiving a file open request from an application, the file open request requesting opening of a file stored on the storage device for transferring file data between the application and the file,
   wherein the CsvFS is connected to the storage device volume to facilitate direct I/O between the computer system and the storage device volume, and the CsvFS is also connected to a file system filter at the one of the clustered computer systems to facilitate re-directed I/O between the computer system and the storage device volume through the file system filter, and
   wherein the file request has an access mode and a sharing mode, the access mode indicating one or more of: writing data to the file or reading data from the file, the sharing mode indicating that the access mode is one of: shared or not shared;
   an act of the CsvFS receiving an oplock request for the file from the application;
   an act of the CsvFS identifying that the computer system has an oplock level corresponding to the file, the oplock level indicating that the computer system has an oplock on the file for one or more of: reading the file or writing the file;
   an act of the CsvFS formulating an appropriate oplock level for the application based on the identified oplock level and the access mode and sharing mode corresponding to any other of the one or more applications having access to the file;
   an act of the CsvFS delegating an oplock indicative of the appropriate oplock level to the application; and
   an act of the CsvFS determining an appropriate I/O mechanism for transferring the file data between the computer system and the storage device volume based on the appropriate oplock level and the access mode, the appropriate I/O mechanism selected from among:
      direct I/O between the computer system and the storage device volume for both reads and writes when the oplock level comprises a read/write oplock level, and
      direct I/O between the computer system and the storage device volume for reads and re-directed I/O through the file system filter for writes when the oplock level comprises a read oplock level.

11. The method as recited in claim 10, wherein the act of the CsvFS identifying that the computer system has an oplock level corresponding to the file comprises an act of identifying that the computer system has a read/write oplock level corresponding to the file.

12. The method as recited in claim 11, wherein the act of the CsvFS formulating an appropriate oplock level for the client comprises an act of formulating a read/write oplock level for the client based on no other clients of the computer system having the file open.

13. The method as recited in claim 10, wherein the act of the CsvFS formulating an appropriate oplock level for the client comprises an act of formulating a read oplock level for the client.

14. The method as recited in claim 10, wherein the act of the CsvFS delegating an oplock comprises an act of delegating an oplock to a locally running application at the computer system.

15. The method as recited in claim 10, wherein the act of the CsvFS delegating an oplock comprises an act of delegating an oplock to an application at a remote client using a remote file system component.

16. At a computer system including one or more processors and system memory, the computer system including a cluster shared volume object, the cluster shared volume object virtualizing access to a storage device volume mounted at one of the clustered computer systems, the computer system including a cluster shared volume file system (CsvFS) on the cluster shared volume object, the CsvFS appearing as a local file system to other components, the computer system being clustered with one or more other computer systems, the computer system and the one or more other computer systems having shared access to the storage device volume, the file system for the storage device volume exposed at the one of the clustered computer systems, a method for providing fault tolerant access to the storage device volume, the method comprising:

an act of the CsvFS receiving a file request for transferring file data between the computer system and a file at the storage device volume, wherein the CsvFS is connected to the storage device volume to facilitate direct I/O between the computer system and the storage device volume, the CsvFS is also connected to a file system filter at the one of the clustered computer systems to facilitate re-directed I/O between the computer system and the storage device volume through the file system filter;

an act of the CsvFS determining an appropriate I/O mechanism for transferring the file data between the computer system and the storage device volume is direct I/O based on an appropriate oplock level for transferring the file data, the appropriate I/O mechanism selected from among:

direct I/O between the computer system and the storage device volume for both reads and writes when the oplock level comprises a read/write oplock level, and direct I/O between the computer system and the storage device volume for reads and re-directed I/O through the file system filter for writes when the oplock level comprises a read oplock level;

an act of the CsvFS detecting that direct I/O to the storage device volume is available;

an act of the CsvFS transferring the file data between the computer system and the storage device volume using direct I/O;

an act of the CsvFS detecting direct I/O to the storage device volume has become unavailable subsequent to transferring the file data using direct I/O;

an act of the CsvFS receiving a second file request for transferring second file data between the computer system and the file subsequent to detecting that direct I/O is not available; and an act of the CsvFS transferring the second file data between the computer system and the storage device volume using re-directed I/O to the clustered computer system where the storage disk volume is available.

17. The method as recited in claim 16, wherein the act of the CsvFS transferring the second file data between the computer system and the storage device volume using re-directed I/O comprise an act of re-directing block level I/O to the one of the clustered computer systems where the storage disk volume is mounted.

18. The method as recited in claim 16, wherein the act of the CsvFS transferring the second file data between the computer system and the storage device volume using re-directed I/O comprise an act of re-directing the file data to the one of the clustered computer systems where the storage disk volume is mounted.

19. The method as recited in claim 16, wherein the act of the CsvFS receiving a file request and the act of receiving a second file request comprise acts of receiving the file request and second file request from an application that views the cluster shared volume file system as a local file system, the method further comprising:

an act of presenting the storage device volume to the application consistently independent of the availability of direct I/O between the computer system and the storage device.

20. The method as recited in claim 16, further comprising providing a symmetrical namespace for the storage device volume, the symmetrical namespace the same at each of the one or more computer systems even when direct I/O is not available at a computer system.

* * * * *